United States Patent
Varma

(10) Patent No.: US 8,793,628 B1
(45) Date of Patent: Jul. 29, 2014

(54) METHOD AND APPARATUS OF MAINTAINING COHERENCY IN THE MEMORY SUBSYSTEM OF AN ELECTRONIC SYSTEM MODELED IN DUAL ABSTRACTIONS

(71) Applicant: Cadence Design Systems, Inc., San Jose, CA (US)

(72) Inventor: Ashutosh Varma, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/793,388

(22) Filed: Mar. 11, 2013

(51) Int. Cl.
*G06F 17/50* (2006.01)

(52) U.S. Cl.
USPC ............... 716/100; 716/101; 703/13; 703/23; 711/147; 711/151; 711/154

(58) Field of Classification Search
USPC ........... 710/139; 716/106, 100–101; 711/117, 711/147–148, 151, 154, 169; 703/13–14, 703/23
See application file for complete search history.

(56) References Cited

U.S. PATENT DOCUMENTS

| | | | | |
|---|---|---|---|---|
| 6,633,960 | B1* | 10/2003 | Kessler et al. | 711/144 |
| 2002/0138704 | A1* | 9/2002 | Hiser et al. | 711/162 |
| 2008/0072236 | A1* | 3/2008 | Pope et al. | 718/108 |
| 2009/0282202 | A1* | 11/2009 | Krimer et al. | 711/154 |
| 2010/0082916 | A1* | 4/2010 | Hosoya | 711/154 |
| 2012/0246419 | A1* | 9/2012 | Proebsting | 711/154 |
| 2013/0097392 | A1* | 4/2013 | Arges et al. | 711/152 |

OTHER PUBLICATIONS

Questa Codelink Turbo, 2011 Mentor Graphics Corporation; www.mentor.com/codelink.

* cited by examiner

*Primary Examiner* — Stacy Whitmore
(74) *Attorney, Agent, or Firm* — Dickstein Shapiro LLP

(57) ABSTRACT

The present patent document relates to a method and apparatus for maintaining coherency in a memory subsystem of an electronic system modeled in dual abstractions. The portions of the memory subsystem shared between the first abstraction and the second abstraction are shadowed in both abstractions, allowing either abstraction to coherently access memory written by the other. The memory subsystem can also reside solely in a first abstraction, where the second abstraction will synchronize to the first abstraction to access the memory subsystem. Flags associated with memory pages of the memory subsystem are set to indicate which abstraction has most recently updated the memory page. Prior to accessing a memory page, the system will check the flags, copying the contents of the memory in the other abstraction as needed to maintain coherency. The abstractions can operate either synchronously or asynchronously.

30 Claims, 4 Drawing Sheets

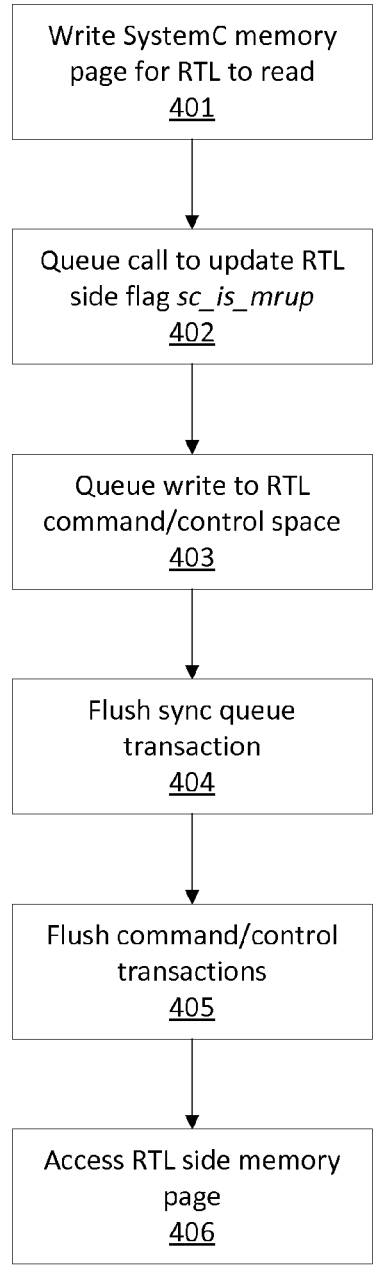
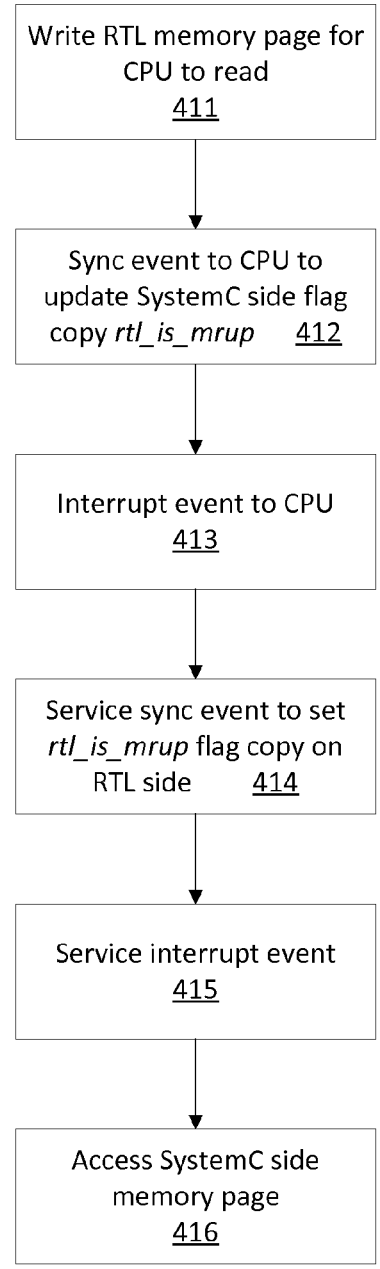
FIG. 4A
FIG. 4B

METHOD AND APPARATUS OF MAINTAINING COHERENCY IN THE MEMORY SUBSYSTEM OF AN ELECTRONIC SYSTEM MODELED IN DUAL ABSTRACTIONS

FIELD

The present patent document relates generally to verifying the functionality of integrated circuit designs prior to fabrication. In particular, the present patent document relates to a method and apparatus for maintaining coherency in the memory subsystem of an electronic system modeled in dual abstractions. Such dual abstractions can include C/SystemC simulation and register transfer level (RTL)/gate level hardware emulation.

BACKGROUND

Increasing numbers of integrated circuits ("chips") feature system on chip ("SoC") designs, where a number of different components are integrated onto a single chip. These components can include digital, analog, and mixed signal devices.

SoC devices can be designed in various abstractions, including C/SystemC transaction accurate, C/SystemC cycle accurate, RTL, and gate abstractions. Often one part of the SoC is modeled in one level of abstraction, while another part is modeled in a different abstraction. This may be done for reasons of efficiency of model creation, accuracy, or performance. As an example, a CPU of the SoC may be best modeled at a SystemC transaction level for faster software code execution, while a sub-block of the SoC is modeled at an RTL level for cycle-accuracy. A SoC model created with more than one abstraction can be termed a "hybrid model."

SoC devices are typically functionally verified prior to fabrication using hardware, software, or a combination of hardware and software specially designed to perform functional verification. Such functional verification devices can include simulators and emulators, both of which can be used to perform co-simulation of hybrid models. An immediate problem that arises out of this hybrid model is representation of shared system resources, such as memory. As an example, for fast CPU execution at the transaction level in SystemC simulation, the memory is typically best modeled in SystemC. However, for fast RTL emulation, the memory is typically best modeled as RTL.

The usage of system level memory in a SoC falls into three broad categories: (i) memory used exclusively by the operating system and user applications for running code and computations (software), (ii) memory used exclusively by SoC's input/output (I/O) blocks for their own storage, and (iii) memory shared between software and I/O blocks. The traditional approach to such shared memory space is to either keep memory as an entirely SystemC model (a "memory-out" approach from the point of view of RTL running in an emulator) or keep memory as entirely RTL ("memory-in" from the point of view of the emulator). In either case, there is significant overhead. In the memory-out case this is because of the RTL frequently accessing a SystemC memory through a RTL-to-SystemC transactor. In the memory-in case this is because of a CPU accessing the RTL memory through a SystemC-to-RTL transactor. This overhead results as the emulator needs to stop and synchronize to SystemC simulation to allow for each of these accesses. These frequent accesses are very inefficient for overall simulation performance of the model. As a result, the system simulation performance will be lower compared to either the all-virtual SystemC SoC model or the all-RTL SoC running in an emulator.

Memory models can also be created that provide native access in both a C/SystemC and RTL abstractions. In this model, two images for each memory are created, one in each abstraction. However, a problem with this topology is maintaining coherency between the two images of the same memory, for each of the memories.

SUMMARY

A method and apparatus for maintaining coherency in the memory subsystem of an electronic system modeled in dual abstractions is disclosed.

An embodiment comprises a method of maintaining coherency in a memory subsystem of an electronic system having hardware and software components modeled in a first design abstraction and a second design abstraction during functional verification of the electronic system, wherein a portion of the memory subsystem is modeled in the first design abstraction having a plurality of memory pages, wherein a first flag is associated with each memory page of the plurality of memory pages, wherein a shadow memory page is modeled in the second design abstraction to store a copy of a contents of a memory page of the plurality of memory pages, and wherein a second flag is associated with the shadow memory page and is to be set to indicate that the memory page is more recently updated than the shadow memory page, comprising updating the memory page modeled in the first design abstraction by writing data to at least a portion of the memory page; setting the first flag associated with the memory page to indicate that the memory page is more recently updated than the shadow memory page; setting the second flag associated with the shadow memory page to indicate that the memory page is more recently updated than the shadow memory page; receiving a request to access the shadow memory page from a portion of the circuit design; checking whether the second flag is set after a request to access the shadow memory page is received; writing the contents of the memory page to the shadow memory page prior to granting the request to access the shadow memory page; and clearing the first flag and the second flag.

In another embodiment a third flag is associated with each memory page of the plurality of memory pages, and a fourth flag is associated with the shadow memory page, the method further comprising updating the shadow memory page modeled in the second design abstraction by writing data to at least a portion of shadow the memory page; setting the third flag associated with the memory page to indicate that the shadow memory page is more recently updated than the memory page; setting the fourth flag associated with the shadow memory page to indicate that the shadow memory page is more recently updated than the memory page; receiving a request to access the memory page from a portion of the circuit design; checking whether the second flag is set after a request to access the shadow memory page is received; writing the contents of the memory page to the shadow memory page prior to granting the request to access; and clearing the third flag and the fourth flag.

In another embodiment the first design abstraction is a SystemC abstraction, and the second design abstraction is a register transfer level abstraction.

In another embodiment the method further comprises setting a flag of a flag array to prevent writing the contents of the memory page to the shadow memory page.

In another embodiment the method further comprises observing a performance metric of the memory subsystem for various memory page and shadow memory page sizes; generating a profile of memory synchronization events; and calculating an optimized memory page and shadow memory page size.

In another embodiment writing the contents of the memory page is performed in a single API call per block transfer.

An embodiment comprises a method of maintaining coherency in a memory subsystem of an electronic system having hardware and software components modeled in a first design abstraction and a second design abstraction during functional verification of the electronic system, wherein a portion of the memory subsystem is modeled in the first design abstraction having a plurality of memory pages, wherein a first flag is associated with each memory page of the plurality of memory pages, wherein a shadow memory page is modeled in the second design abstraction to store a copy of a contents of a memory page of the plurality of memory pages, and wherein a second flag is associated with the shadow memory page and is to be set to indicate that the memory page is more recently updated than the shadow memory page, comprising: writing data to at least a portion of the memory page modeled in the first design abstraction; detecting that the data has been written; queuing an event to update the second flag associated with the shadow memory page; queuing an event to write a contents of the memory page to the shadow memory page; setting the second flag to indicate that the memory page is more recently updated than the shadow memory page; writing the contents of the memory page to the shadow memory page prior to granting a request to access the shadow memory page; and clearing the second flag.

In another embodiment the first design abstraction is a SystemC abstraction, and the second design abstraction is a register transfer level abstraction.

In another embodiment queuing the event to write a contents of the memory page to the shadow memory page comprises queuing the event to the command and control space of the register transfer level abstraction.

In another embodiment the first design abstraction is a register transfer level abstraction, and the second design abstraction is a SystemC abstraction.

In another embodiment queuing the event to write a contents of the memory page to the shadow memory page comprises queuing a CPU interrupt to write a contents of the shadow memory page.

In another embodiment the method further comprises setting a flag of a flag array to prevent writing the contents of the memory page to the shadow memory page.

In another embodiment the method further comprises observing a performance metric of the memory subsystem for various memory page and shadow memory page sizes; generating a profile of memory synchronization events; and calculating an optimized memory page and shadow memory page size.

An embodiment comprises a functional verification system for verifying a circuit design modeled in a plurality of abstractions while maintaining memory coherency, comprising: a model of a first portion of a circuit design programmed in a first design abstraction; a model of a second portion of a circuit design programmed in a second design abstraction; a model of a memory subsystem for memory of the circuit design shared between the model of the first portion of the circuit design and the model of the second portion of the circuit design, and programmed in part in the first design abstraction and programmed in part in the second design abstraction, comprising: a memory page pair, wherein a first memory page of the pair is modeled in the first abstraction and is in electrical communication with the model of the first portion of the circuit design, and wherein a second memory page of the pair is modeled in the second abstraction and is in electrical communication with the model of the second portion of the circuit design; a first flag, associated with the first memory page, to indicate when set that the first memory page is more recently updated than the second memory page, wherein the first flag is set in response to a write access to at least a portion of the first memory page; a second flag, associated with the second memory page, to indicate when set that the first memory page is more recently updated than the second memory page, wherein the second flag is set in response to a write access to at least a portion of the first memory page, wherein the second flag is checked in response to a request to access the second memory page, and wherein the second flag is cleared after a contents the first memory page is copied to the second memory page.

In another embodiment the model of the memory subsystem further comprises: a third flag, associated with the second memory page, to indicate when set that the second memory page is more recently updated than the first memory page, wherein the third flag is set in response to a write access to at least a portion of the second memory page; and a fourth flag, associated with the first memory page, to indicate when set that the second memory page is more recently updated than the first memory page, wherein the fourth flag is set in response to a write access to at least a portion of the second memory page, wherein the fourth flag is checked in response to a request to access the first memory page, and wherein the fourth flag is cleared after a contents the second memory page is copied to the first memory page.

In another embodiment the first design abstraction is a SystemC abstraction, and the second design abstraction is a register transfer level abstraction.

In another embodiment the model of the memory subsystem further comprises a flag array to prevent writing the contents of the first memory page to the second memory page.

An embodiment comprises a computer-readable non-transitory storage medium having stored thereon a plurality of instructions, the plurality of instructions when executed by a computer, cause the computer to perform: providing a memory subsystem of an electronic system having hardware and software components modeled in a first design abstraction and a second design abstraction during functional verification of the electronic system, wherein a portion of the memory subsystem is modeled in the first design abstraction having a plurality of memory pages, and wherein a shadow memory page is modeled in the second design abstraction to store a copy of a contents of a memory page of the plurality of memory pages; updating the memory page modeled in a first design abstraction by writing data to at least a portion of the memory page; setting a first flag associated with the memory page to indicate that the memory page is more recently updated than the shadow memory page, wherein the first flag is associated with each memory page of the plurality of memory pages; setting a second flag associated with the shadow memory page to indicate that the memory page is more recently updated than the shadow memory page, wherein the second flag is associated with the shadow memory page and is to be set to indicate that the memory page is more recently updated than the shadow memory page; receiving a request to access the shadow memory page from a portion of the circuit design; checking whether the second flag is set after a request to access the shadow memory page is received; writing the contents of the memory page to the shadow memory page prior to granting the request to access the shadow memory page; and clearing the first flag and the second flag.

In another embodiment the plurality of instructions when executed by a computer, cause the computer to further perform: updating the shadow memory page modeled in the second design abstraction by writing data to at least a portion of shadow the memory page; setting a third flag associated with the memory page to indicate that the shadow memory page is more recently updated than the memory page, wherein the third flag is associated with each memory page of the plurality of memory pages; setting a fourth flag associated with the shadow memory page to indicate that the shadow memory page is more recently updated than the memory page, wherein the fourth flag is associated with the shadow memory page; receiving a request to access the memory page from a portion of the circuit design; checking whether the second flag is set after a request to access the shadow memory page is received; writing the contents of the memory page to the shadow memory page prior to granting the request to access; and clearing the third flag and the fourth flag.

In another embodiment the first design abstraction is a SystemC abstraction, and the second design abstraction is a register transfer level abstraction.

In another embodiment the plurality of instructions when executed by a computer, cause the computer to further perform setting a flag of a flag array to prevent writing the contents of the memory page to the shadow memory page.

In another embodiment the plurality of instructions when executed by a computer, cause the computer to further perform: observing a performance metric of the memory subsystem for various memory page and shadow memory page sizes; generating a profile of memory synchronization events; and calculating an optimized memory page and shadow memory page size.

In another embodiment writing the contents of the memory page is performed in a single API call per block transfer.

An embodiment comprises a computer-readable non-transitory storage medium having stored thereon a plurality of instructions, the plurality of instructions when executed by a computer, cause the computer to perform: providing a memory subsystem of an electronic system having hardware and software components modeled in a first design abstraction and a second design abstraction during functional verification of the electronic system, wherein a portion of the memory subsystem is modeled in the first design abstraction having a plurality of memory pages, wherein a first flag is associated with each memory page of the plurality of memory pages, and wherein a shadow memory page is modeled in the second design abstraction to store a copy of a contents of a memory page of the plurality of memory pages; writing data to at least a portion of the memory page modeled in the first design abstraction; detecting that the data has been written; queuing an event to update a second flag associated with the shadow memory page, wherein the second flag is associated with the shadow memory page and is to be set to indicate that the memory page is more recently updated than the shadow memory page; queuing an event to write a contents of the memory page to the shadow memory page; setting the second flag to indicate that the memory page is more recently updated than the shadow memory page; and writing the contents of the memory page to the shadow memory page prior to granting a request to access the shadow memory page; and clearing the second flag.

In another embodiment the first design abstraction is a SystemC abstraction, and the second design abstraction is a register transfer level abstraction.

In another embodiment queuing the event to write a contents of the memory page to the shadow memory page comprises queuing the event to the command and control space of the register transfer level abstraction.

In another embodiment the first design abstraction is a register transfer level abstraction, and the second design abstraction is a SystemC abstraction.

In another embodiment queuing the event to write a contents of the memory page to the shadow memory page comprises queuing a CPU interrupt to write a contents of the shadow memory page.

In another embodiment the plurality of instructions when executed by a computer, cause the computer to further perform setting a flag of a flag array to prevent writing the contents of the memory page to the shadow memory page.

In another embodiment the plurality of instructions when executed by a computer, cause the computer to further perform: observing a performance metric of the memory subsystem for various memory page and shadow memory page sizes; generating a profile of memory synchronization events; and calculating an optimized memory page and shadow memory page size.

The above and other preferred features described herein, including various novel details of implementation and combination of elements, will now be more particularly described with reference to the accompanying drawings and pointed out in the claims. It will be understood that the particular methods and apparatuses are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate the presently preferred embodiments and together with the general description given above and the detailed description of the preferred embodiments given below serve to explain and teach the principles described herein.

FIG. 4A illustrates a flow in an asynchronous mode of operation where a CPU updates a SystemC memory page that the RTL needs to read after instructed to do so by the CPU.

FIG. 4B illustrates a flow in an asynchronous mode of operation where RTL updates a SystemC memory page for the CPU to read after the RTL informs the CPU that it is available to be read.

Figure 1:
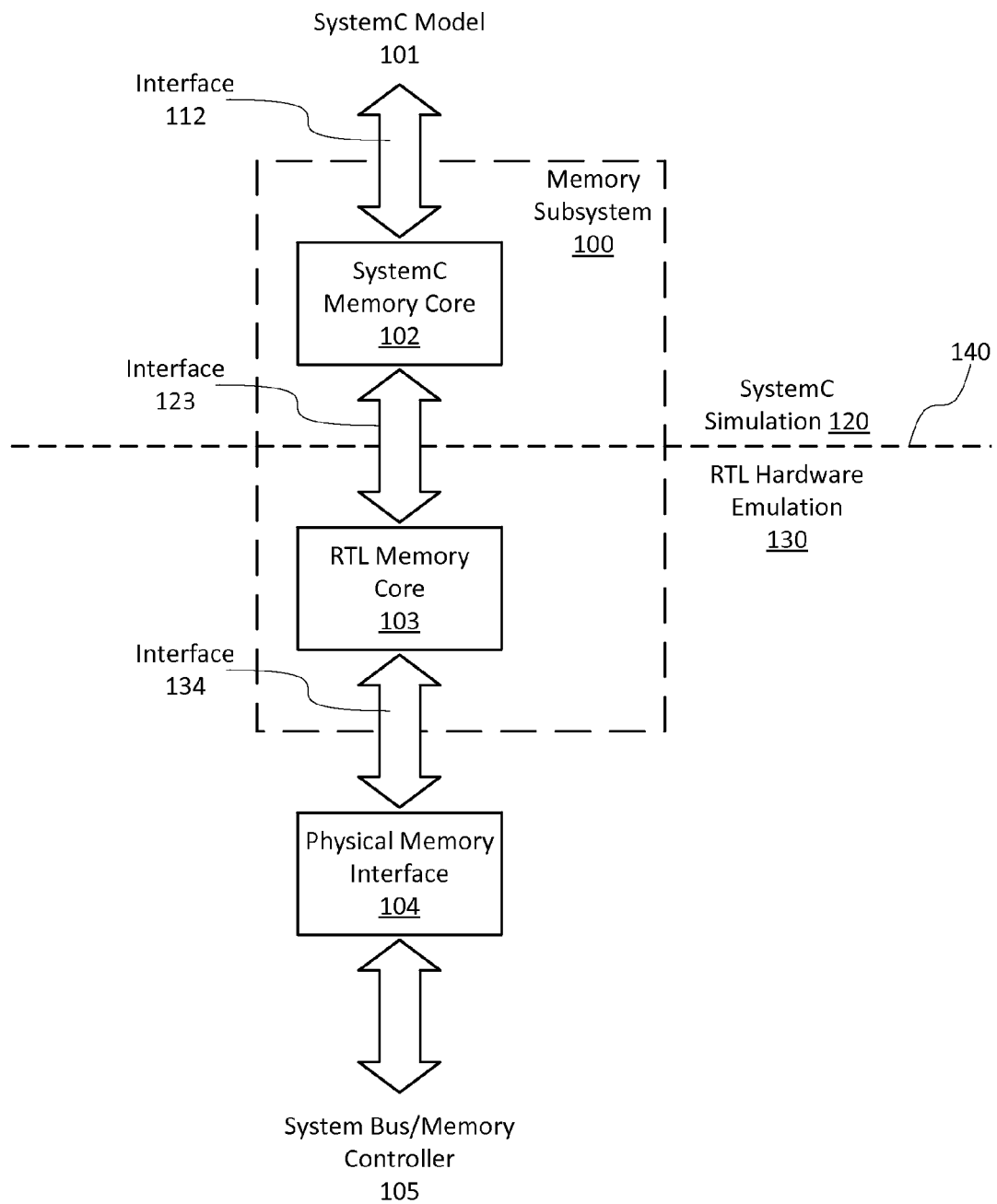
FIG. 1 is an illustration a memory subsystem that allows execution in either SystemC simulation or RTL emulation.

The figures are not necessarily drawn to scale and the elements of similar structures or functions are generally represented by like reference numerals for illustrative purposes throughout the figures. The figures are only intended to facilitate the description of the various embodiments described herein; the figures do not describe every aspect of the teachings disclosed herein and do not limit the scope of the claims.

DETAILED DESCRIPTION

A method and apparatus for maintaining coherency in the memory subsystem of an electronic system modeled in dual abstractions for C/SystemC simulation and RTL/gate level hardware emulation is disclosed. Each of the features and teachings disclosed herein can be utilized separately or in conjunction with other features and teachings. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the various embodiments described herein. However, it will be apparent to one skilled in the art that these specific details are not required to practice the concepts described herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Also disclosed is an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), erasable programmable read-only memories (EPROMs), electrically erasable programmable read-only memories (EEPROMs), magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the present teachings.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIG. 1 illustrates, according to an embodiment, a system for maintaining coherency in the memory subsystem 100 of a SoC modeled in two abstractions, a first for C/SystemC simulation and a second for RTL or gate-level emulation. The memory subsystem 100 is part of the overall system memory. Depending on the design of the SOC, memory subsystem 100 can comprise the entirety of the system memory. Divide 140 separates the two memory abstractions' images into a C/SystemC simulation side 120 and a RTL hardware emulation side 130. On the C/SystemC simulation side 120, the C/SystemC memory core 102 has an interface 112 with SystemC Model 101. Interface 112 can be for example a transaction-level model interface, such as SystemC TLM2, or a direct memory interface (DMI). On the RTL hardware emulation side 130, the RTL memory core 103 has a generic interface 134 with physical memory interface 104, which is in communication with the system bus/memory controller 105.

The SystemC memory core 102 and RTL memory core 103 are images of the same memory; shared memory block 100 has both a SystemC model of memory as well as a shadow RTL memory. In other embodiments, the memory block can have a RTL model of memory as well as a shadow SystemC memory. Shared memory block 100 is used for a hybrid virtual SystemC-plus-RTL model, where a particular section of system memory map is used exclusively for communication back and forth between CPU in the SystemC virtual environment and an RTL block. Shared memory block 100 minimizes this need for cross-abstraction access by maintaining memory in one abstraction and the shadow memory in the other abstraction and implementing a method of coherency from either perspective through software modeling and emulation (direct memory access to RTL memory blocks in emulator) techniques. Shared memory block 100, and consequently SystemC memory core 102 and RTL memory core 103, is divided into pages. The sizes of the pages can be determined based on the application using the memory space. This minimizes the need for synchronization while maximizing the usage of memory transfer bandwidth.

The memory subsystem space is part of the overall system memory, and can be accessed using TLM2 transactions, and can be accessed using DMI. Where the memory space is a subset of the overall system memory space, the memory subsystem is able to be allocated into a particular portion of the CPU memory space. Allocation involves both size and address allocation, through a flexible memory map configuration. The memory subsystem 100 provides a RTL shadow memory model for a desired CPU and interconnect bus architecture in RTL. Such bus architectures include an Advanced eXtensible Interface™ (AXI™), AXI Coherency Extensions™ (ACE™), or a double data-rate type three (DDR3) interface. Whichever of these bus architectures is used, RTL memory core 103 is bus architecture independent and can support any particular RTL access protocol. The implementation of memory subsystem 100 does not require changes to the operating system, drivers, or the application of the user of the system.

According to another embodiment, the subsystem memory space comprises the full system memory.

According to an embodiment, the memory subsystem can be operated in a time-synchronized co-simulation/emulation execution mode, where the SystemC and RTL abstractions maintain strict time wheel synchronization. Here, the emulation running the RTL and the simulator running SystemC are alternating to process models in either abstraction, and TLM2 transactions are used in the SystemC memory core since a TLM2 access in SystemC can decode read and write transactions. With an alternating process automatic coherency can be implemented, where the shared memory model itself can automatically ensure coherency.

In this configuration, the shared memory block resides as a specific block of memory within the system memory and is allocated a port from a dynamic router, and the system memory supports TLM2 accesses. The shared memory space is divided into pages based on the size of pages used based on the application. Associated with each page is a most recently updated ("MRUP") bit flag, one in the memory domain for each abstraction, corresponding to one of the two abstractions, that is kept consistent across the domains. Thus, there are a pair of bit flags in the memory page of each abstraction: a MRUP bit flag in the SystemC abstraction (sc_is_mrup) and a MRUP bit flag in the RTL abstraction (rtl_is_mrup). When a page is written in one abstraction, its corresponding MRUP bit flag is also set at the same time in the other domain. Using the alternating mode having an appropriate API providing deterministic access, access to RTL and memory objects in the same time-step are ensured. When an address of a memory page is attempted to be read or written in one abstraction when its MRUP flag is set, the memory page is first swapped to be coherent with the other abstraction before the read data is returned.

Figure 2:
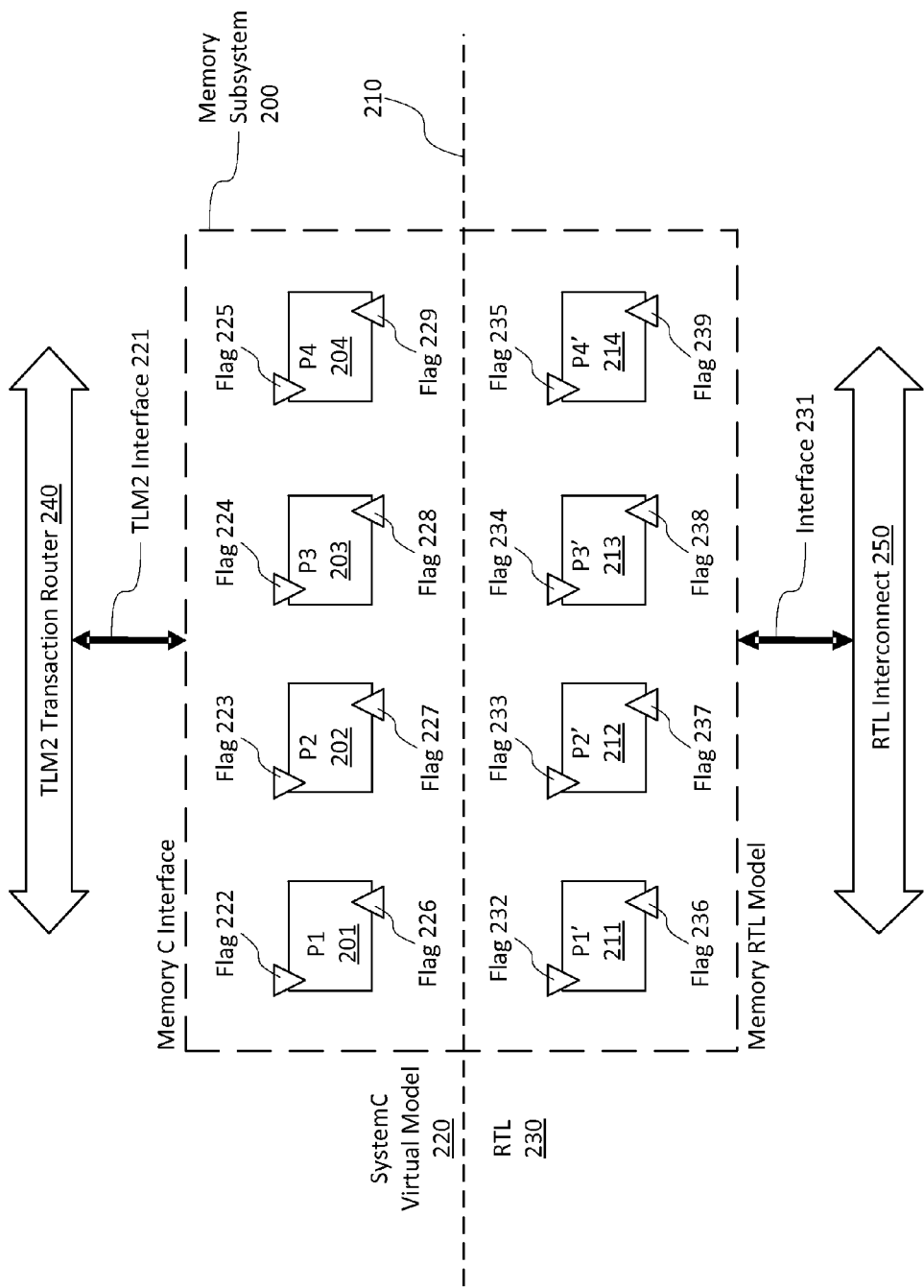
FIG. 2 is a second illustration of a memory subsystem that allows execution in either SystemC simulation or RTL emulation.

FIG. 2 provides an illustration of a memory subsystem according to an embodiment. There are illustrated four memory pages (P) of the memory subsystem 200, where a page is the smallest unit of memory that is synchronized between the SystemC virtual model 220 and RTL model 230, each on either side of the divider 210. Each page P has a representation in both SystemC and a shadow page in RTL page prime (P'). Thus the first page P1 201 on the SystemC side has a shadow page P1' 211 on the RTL side, the second page P2 202 has a shadow page P2' 212, the third page P3 203 has a shadow page P3' 213, and the fourth page P4 204 has a shadow page P4' 214.

Each page and shadow page (P and P' respectively), have an associated pair of flags. The first flag of the pair for each memory page on the SystemC virtual model side 220 is a flag indicating the SystemC memory page is the most recently updated (sc_is_mrup). The first flag of the pair for each memory page of the RTL side 220 is a flag indicating the RTL memory page is the most recently updated (rtl_is_mrup). The second flag of the pair on each side is a copy of these two flags. So, the second flag on the SystemC virtual model side 220 is a copy of the rtl_is_mrup flag, rtl_is_mrup copy, and the second flag on the RTL side is a copy of the sc_is_mrup flag, sc_is_mrup copy. As such, in FIG. 2, the sc_is_mrup flags for pages P1 201 to P4 204 are flags 222 to 225 respectively; the copies of these flags, for the shadow pages P1' 211 to P4' 214 are flags 232 to 235 respectively. The rtl_is_mrup copy flags for pages P1 201 to P4 204 are flags 226 to 229 respectively; the copies of these flags, for the shadow pages P1' 211 to P4' 214 are flags 236 to 239 respectively.

The SystemC virtual model side 220 of the memory subsystem 200 interfaces with a TLM2 transaction router 240 with a transaction-level model interface, such as TLM2 interface 221. According to the other embodiments, other transaction model level interfaces and corresponding routers can be used. The RTL model side 230 interfaces with RTL interconnect 250 with a suitable bus interface of the SOC, for example any of an Advanced High-performance bus (AHB), AXI™, ACE™, or a DDR3 interface.

Figure 3:
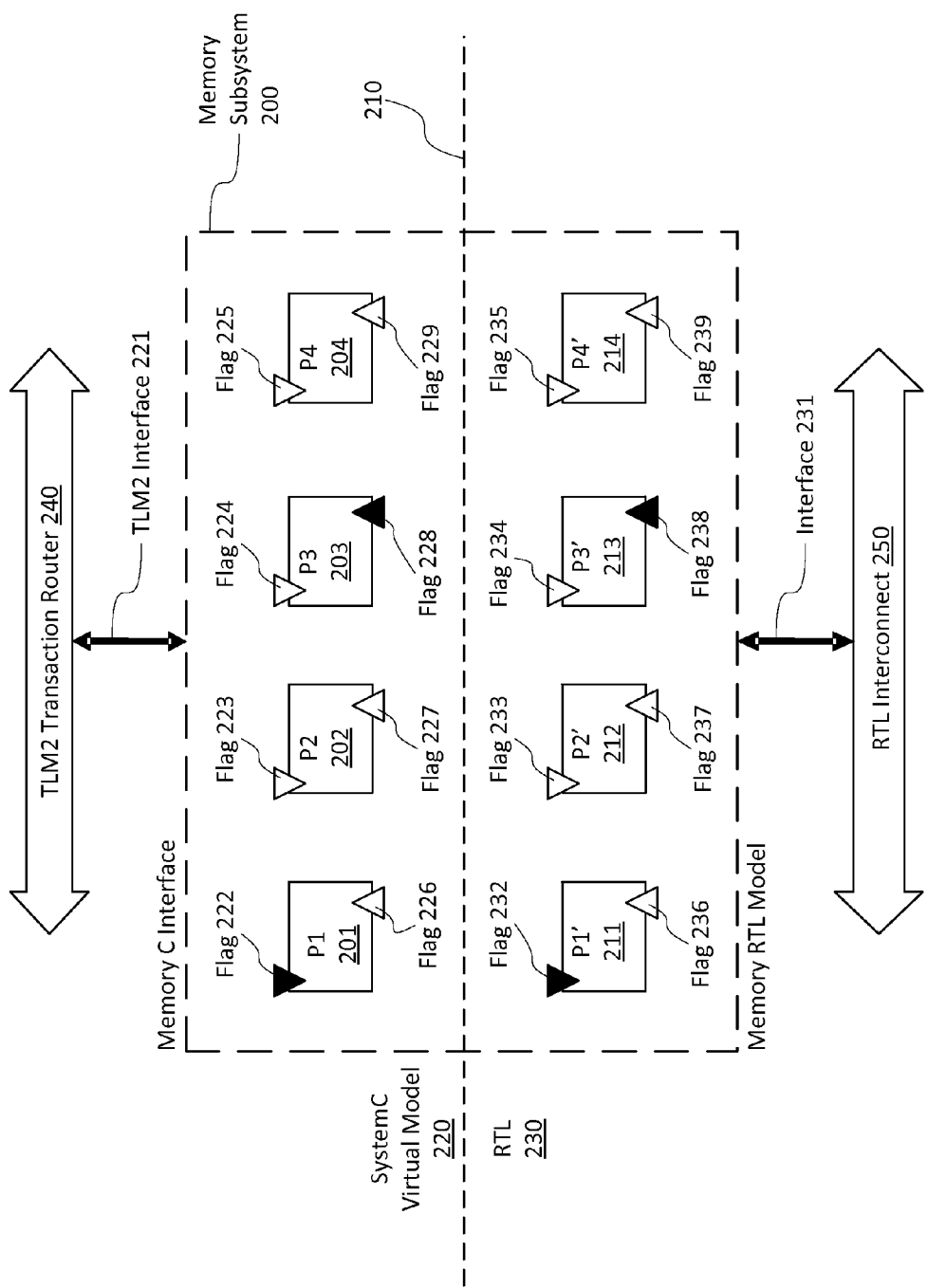
FIG. 3 is the second illustration of a memory subsystem that allows execution in either SystemC simulation or RTL emulation operating in a coherent mode.

FIG. 3 illustrates the coherency mechanism of memory subsystem 200 according to an embodiment. On the RTL side, memory page and shadow memory page pairs, P1 and P1', P2 and P2', P3 and P3', and P4 and P4' are similarly written to and updated. Though only certain examples are discussed, the disclosed coherency mechanism can be expanded to the remaining memory pages and shadow memory pages. Likewise, a greater or fewer number of memory pages can be kept coherent according to other embodiments.

For example, on the RTL side, page P3' 213 is written, its corresponding rtl_is_mrup flag 238 is set on the RTL side 230, and the rtl_is_mrup flag copy 228 is set on the SystemC side 220 in the same time step. The setting is done deterministically within a synchronization event, when both emulation on the RTL side and simulation on the SystemC side are stopped. Then, when a later TLM2 access is made to page P3, the system will ensure that with emulation and SystemC stopped, the memory page P3 203 on the SystemC side is first updated from the latest contents from the memory page P3' 213 on the RTL side. Once the memory page is updated, then its corresponding rtl_is_mrup flag is then cleared. This is done deterministically in zero simulation time maintaining coherency between the two sides.

As another example, on the SystemC side, for example when memory page P1 201 is written through the TLM2 transaction router 240 and TLM2 interface 221, sc_is_mrup flag 222 on the SystemC side 220 and sc_is_mrup flag copy 232 on the RTL side 230 are set. Then, on the next read/write access from the RTL side, through RTL interconnect 250 and interface 231, to shadow memory page P1' 211, the system on the RTL side 230 will see that sc_is_mrup flag copy 232 is set. Because the flag is set, a synchronization event will first update the contents of page memory P1' 211 will be updated from the contents of page memory P1 201.

The flags on both the RTL side 230 and SystemC side 220 are monitored, and the contents of the corresponding memory pages updated, automatically to maintain the coherency of the two memory images in a synchronized mode. This mode is deterministic in that it ensures coherency in a lock-step manner.

According to another embodiment in a synchronous mode, a coherency mechanism operates in an asynchronous mode. In the asynchronous mode, the flags are not set deterministically in the other abstraction. It is not ensured that the other abstraction is not currently executing and reading the corresponding page during the time that it takes for the operation to set the flag in the corresponding abstraction. Time elapses from the time that a memory page is written and the time that flags are set because the two abstraction models synchronize only on discrete intervals, referred to as polling events. For example, referring to FIG. 3, memory page P1 201 is written on the SystemC side 220, setting sc_is_mrup flag 222. The system takes a finite time to write the corresponding flag copy, sc_is_mrup flag copy 232. During this finite time, a read/write request can come to memory page P1' 211 on the RTL side 230. Likewise, the memory pages on the RTL side 230 can be written, for example memory page P3' 213, setting the rtl_is_mrup flag 238. Before the corresponding flag copy, rtl_is_mrup flag copy 228 associated with memory page P3 203 is updated, a read/write request may come through the TLM2 transaction router 240 and TLM2 interface 221 accessing memory page P3 203, which does not yet have update memory page contents copied from shadow memory page P3' 213.

Thus, an asynchronous mode is to be used with an alternate interlocking mechanism for each memory page that the user of the system or the application implements to ensure that a memory page and its corresponding shadow memory page are not accessed at the same time. This ensures that collisions are avoided and memory pages having stale contents are not accessed. In complex systems with operating system and application software interacting with blocks of RTL logic, the transactions to system memory arising out of software execution are to a large extent asynchronous to the RTL transactions to the memory. High-level synchronization of accesses to specific areas is achieved by use of command/control registers from software to RTL and interrupt mechanism from RTL to software. Software can update information in a section of system memory. The RTL block which is to read this section of memory is directed to access these memory locations on command from the software. RTL can also update a certain section of system memory, then interrupt the CPU to allow software to read that memory. According to these implicit exclusivities of access, even with asynchronous mode latency the above-described MRUP flag based mechanism, including sc_is_mrup and rtl_is_mrup flags and their corresponding flag copies, is effective to maintain coherency. FIGS. 4A and 4B illustrate a flow for a coherency mechanism having implicit exclusivity of access, even with asynchronous mode latency, according to an embodiment.

FIG. 4A illustrates the situation where the CPU updates the same memory page that that RTL side needs to read after it is instructed to do so by the CPU. In this case, the RTL model needs to have the memory page to be read marked with a sc_is_mrup flag before the RTL read access. At step 401 the CPU writes in the system memory the data that has been prepared for access by the RTL side. At step 402, the SystemC model detects that a write to shared memory space has occurred. The SystemC model makes a call to update the sc_is_mrup flag on the RTL side. This call is queued, not yet setting the flag on the RTL side, because of the asynchronous execution mode. At step 403, the CPU then writes to the RTL command and control space to give it access to the data that it has written during step 401. This transaction is not executed immediately, but instead is queued because of the asynchronous execution mode. Step 404 occurs at the next polling or sync interval. The transaction in the queue to set the RTL side memory page sc_is_mrup flag that was queued in step 402 is flushed. At step 405 the command and control transaction queued in step 403 to set the sc_is_mrup is flushed. During step 406, the RTL read access detects that the sc_is_mrup flag has been set during step 404. At step 407, the memory page content is then updated from the SystemC memory page to the RTL memory page, making the memory page the same on both the SystemC side and the RTL side. Coherency of memory accesses is maintained in the hybrid system because of the sequential execution of step 402 followed by step 403 in an asynchronous mode of operation.

FIG. 4B illustrates the situation where the RTL updates a page with information for the CPU to read. At step 411, an RTL memory page is written to for the CPU to read. At step 412, a sync event is sent to the CPU to update the SystemC side flag copy rtl_is_mrup. At step 413, an interrupt event is sent to the CPU to signal that data is available to be read in the page memory on the RTL side. At the next polling or sync interval, the events are serviced. So, at step 414, the sync event to set the flag copy of rtl_is_mrup is serviced. Thereafter, the interrupt event to the CPU is serviced at step 415, following the sync event of step 414, ensuring that the SystemC is notified of the updated memory page before it is notified of the interrupt event, maintaining coherency between the memory pages.

In an alternative embodiment, the control flow between SystemC and RTL is implemented using a semaphore-based control flow. This semaphore based interlocking mechanism is conceptually suited quite well for the asynchronous nature of execution of two processes competing for access to a shared resource, meaning that it will naturally work well in an asynchronous execution mode as well.

TLM2, as discussed in connection with certain disclosed embodiments, is not the only interface that can be used. According to other embodiments a direct memory interface ("DMI") is used, meaning that the operating system can run a system memory model using DMI accesses. Where DMI accesses are made to system memory, the system does not decode read/write transactions out of the shared memory space because it does not get notified of any transactions taking place form the initiator in System C. Therefore on the SystemC side there is no automatic method of maintaining coherency if an access to a particular memory word is made using the DMI facility. An explicit TLM2 transaction based access is needed to enable coherency mechanisms to work according to the above-disclosed procedures.

One the RTL side, read/write transactions can be ascertained and coherency maintained in one direction. When the RTL side reads a word of memory, we can see if this page of memory was updated by a SystemC application. The same is true when RTL writes a word of memory: the SystemC page is informed that a page was written.

The memory subsystem has two primary components: a SystemC model and an RTL model. The two models can communicate to maintain coherency using standard interfaces.

The SystemC memory model has additional features to a standard SystemC simulation memory model. First, a parameter is set that constructs the space in which SystemC and RTL memory coherency will need to be maintained. This is the offset within the memory space mapped to the memory instance in which shared usage of the SystemC and RTL is to be enabled. An unsigned parameter segments the shared memory space and defines it into memory pages, for which flags will be maintained. The page size is obtained from RTL memory instance level parameters. A Boolean is added to enable the shared space synchronization. If the flag is disabled, then the memory subspace's RTL model will table swapping and local caching of memory pages in RTL memories and default to a word-by-word direct access between SystemC and RTL. A SystemC event is added to trigger synchronization from SystemC to RTL for shared memory space. An associated member function can be used to return a reference to this event. Another SystemC event is added to trigger synchronization from RTL to SystemC for the shared memory space. An associated member function can be used to return a reference to this event.

The RTL model also has additional features. The model can support various fabric protocols and memory types, including AHB, AXI™ (including AXI3™ and AXI4™), ACE™, and DDR3 interface. The memory subsystem RTL model is configured as a synthesizable slave component in the associated fabric protocol, so that it can be compiled and run in an emulator. The size of the memory supported is flexible and configurable. Generally the physical splitting of the memory space into a number of instances needs to be done to ensure that the memory is mapped to the memory of the emulator. Upon initialization, the RTL model communicates the instance name and the size of each of the separate physical instances to the memory subsystem's SystemC model through a call at initialization time, for example a Direct Programming Interface (DPI) call. The allows the memory subsystem SystemC model to access appropriate instances when synchronizing the memory subsystem. The RTL model also has a configurable memory page size, and communicates the memory page size to the SystemC model at the time of initialization. The memory page is the smallest until of memory managed for caching and synchronization purposes. Accordingly the RTL model will maintain two arrays of flags per memory page: an array of sc_is_mrup flags indicating that the memory page on the SystemC side is the more recently updated memory page (as opposed to the RTL side), and an array of rtl_is_mrup flags indicating that the memory page on the RTL side is the more recently updated memory page (as opposed to the SystemC side). The sc_is_mrup flag is set by SystemC via a DPI call on receiving a trigger on a sync to RTL even in SystemC. This call is cleared by the RTL model upon synchronization from the SystemC side memory page to the corresponding RTL side memory page. Even though SystemC model sets the sc_is_mrup flags for all pages, only those memory pages that will actually be read or written subsequently by RTL will be selectively synchronized. The SystemC model sets flags for all memory pages because the DMI access to the memory subsystem model cannot determine if the SystemC side wrote only to some specific memory pages or to all the pages.

On the other side, the rtl_is_mrup flag is set by RTL upon a write from RTL. The rtl_is_mrup flag is cleared by SystemC upon synchronization from the RTL memory page to the SystemC memory page on the basis of an trigger on an event in SystemC. Only those memory pages whose for whom their rtl_is_mrup flag has been set will be synchronized.

According to another embodiment, a profile can be created to optimize the memory page size used for synchronization. Certain applications can benefit from tailoring of the memory page size specifically to that application. Where the selected memory page size for synchronization purposes is too small, more overhead is required. First, more software code is needed to handle memory page flags and determine which pages need to be synchronized. Second a greater number of API calls are needed, since each call has a fixed overhead in addition to the variable amount of overhead needed based on the size of the transfer. However, a larger memory page size can be self-defeating because a transfer of the entire memory page will be triggered even if just a small, localized portion of the memory is read or written. As a result, a trade-off between a small memory page size and a large memory page size is needed. As a result, a variable memory page size can be desirable so that an optimized memory page size can be determined after observing the performance of the memory subsystem for a few iterations in a particular operating environment. After observing the amount of memory read or written, and the corresponding number of synchronizations needed, for various configurations of the memory page size, a profile can be created and an optimized memory page size generated based on the profile.

According to another embodiment, the memory page synchronization is performed with a single Standard Co-Emulation Modeling Interface (SCEMI) to DMI application programming interface (API) call per block transfer.

At the beginning of simulation, all memory pages of the memory subsystem space are marked as sc_is_mrup. DMI is enabled in the entire memory space, allowing the CPU initiator model to execute using DMI accesses after it boots. The CPU model can read and write to the sections of memory using DMI, without using explicit TLM2 transactions. RTL is ten instructed by the CPU to access particular sections of the shared memory. Based on rear or write accesses on the RTL side, the corresponding page on the SystemC side will be marked as a shared space and DMI will be disabled for this memory page. As a result of this DMI disable, subsequent CPU accesses to this page use explicit TLM2 read and write transaction. This allows the coherency mechanism to work seamlessly, without the need for the user of the system to intervene.

In a large system memory, generally only a few section of the memory are typically shared between software and RTL. The majority of software executes in the system memory space that is never accessed by RTL. This allows for implementation where the DMI mode can be used for most of the software execution, while limited section of the system memory shared with RTL use explicit TLM2 transactions to allow coherency mechanisms to function. The above DMI implementation can automatically and dynamically ascertain at runtime which sections of memory can enable DMI and which need to use TLM2 transactions for the sake of coherency. Here, SystemC TLM2 initiators support disabling DMI for specified ranges of memory at run-time, consistent with API calls of the TLM2 standard.

The above-disclosed provide several advantages. The techniques needed for maintaining coherency between two heterogeneous abstraction platforms, such as SystemC simulation and hardware (RTL) emulation, result in more efficient execution, and thus higher performance execution, on both the simulation side and the emulation side. Also, the identification of those memory pages that are accessed by both SystemC and RTL, resulting in coherency between the systems. The above-disclosed coherency mechanism also allows the use of a DMI mode of operation while continuing to maintain coherency.

Two of the above disclosed embodiments have been tested against an approach using an intermediary SystemC proxy module corresponding to a "memory-out" configuration. In the proxy-based technique, the RTL model emulation synchronizes with the SystemC simulation for every access from RTL to system memory. A SystemC transaction is generated for each such access using an intermediary proxy SystemC module. The data is then returned from this proxy module to the RTL emulation side.

To compare the performance of the above-described embodiments, a prototype SOC design was co-simulated in an exemplary emulation and simulation system using two of the above-disclosed embodiment, one where the memory image was able to be maintained in both SystemC and RTL, and one where the memory image is only maintained in SystemC. First, both were evaluated to ensure functional correctness, that is, that coherency was maintained. Second, the performance of both were evaluated by observing the time needed to simulate a shared memory space used as a video data buffer, where the RTL block read from this buffer to convert the stored data into a video signal. For the SystemC proxy-based technique, the simulation of twelve 640 pixel by 480 pixel video images required 26 minutes. For the SystemC and RTL memory image system according to the above-disclosed embodiments, the simulation took as little as 2½ minutes. In an another embodiment, where the memory image is only maintained in SystemC and accessed using DPI instead of SystemC proxy, simulation took as little as 4 minutes. Thus, either implementation according to the above-disclosed embodiments resulted in a significant performance improvement over the proxy-based technique.

Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

I claim:

1. A method of maintaining coherency in a memory subsystem of an electronic system having hardware and software components modeled in a first design abstraction in a software simulator and a second design abstraction in a hardware emulator in electrical communication with the software simulator during functional verification of the electronic system, wherein a portion of the memory subsystem has a plurality of memory pages modeled in the software simulator using the first design abstraction, wherein a first flag is associated with each memory page of the plurality of memory pages, wherein a shadow memory page is modeled in the hardware emulator using the second design abstraction to store a copy of a contents of a memory page of the plurality of memory pages, and wherein a second flag is associated with the shadow memory page and is to be set to indicate that the memory page is more recently updated than the shadow memory page, comprising:

updating the memory page modeled in the first design abstraction in the software simulator by writing data to at least a portion of the memory page;

setting the first flag associated with the memory page to indicate that the memory page in the software simulator is more recently updated than the shadow memory page in the hardware emulator;

setting the second flag associated with the shadow memory page to indicate that the memory page is more recently updated than the shadow memory page;

receiving a request to access the shadow memory page from a portion of the circuit design programmed into the hardware emulator;

checking whether the second flag is set after a request to access the shadow memory page is received;

writing the contents of the memory page in the software simulator to the shadow memory page in the hardware emulator prior to granting the request to access the shadow memory page; and clearing the first flag and the second flag.

2. The method of claim 1, wherein a third flag is associated with each memory page of the plurality of memory pages, and wherein a fourth flag is associated with the shadow memory page, further comprising:

updating the shadow memory page modeled in the second design abstraction by writing data to at least a portion of shadow the memory page;

setting the third flag associated with the memory page to indicate that the shadow memory page is more recently updated than the memory page;

setting the fourth flag associated with the shadow memory page to indicate that the shadow memory page is more recently updated than the memory page;

receiving a request to access the memory page from a portion of the circuit design;

checking whether the second flag is set after a request to access the shadow memory page is received;

writing the contents of the memory page to the shadow memory page prior to granting the request to access; and clearing the third flag and the fourth flag.

3. The method of claim 1, wherein the first design abstraction is a SystemC abstraction, and wherein the second design abstraction is a register transfer level abstraction.

4. The method of claim 3, further comprising setting a flag of a flag array to prevent writing the contents of the memory page to the shadow memory page.

5. The method of claim 1, further comprising:

observing a performance metric of the memory subsystem for various memory page and shadow memory page sizes;

generating a profile of memory synchronization events; and calculating an optimized memory page and shadow memory page size.

6. The method of claim 1, wherein writing the contents of the memory page is performed in a single API call per block transfer.

7. A method of maintaining coherency in a memory subsystem of an electronic system having hardware and software components modeled in a first design abstraction in a software simulator and a second design abstraction in a hardware emulator in electrical communication with the software simulator during functional verification of the electronic system, wherein a portion of the memory subsystem has a plurality of memory pages modeled in the software simulator using the first design abstraction, wherein a first flag is associated with each memory page of the plurality of memory pages, wherein a shadow memory page is modeled in the hardware emulator using the second design abstraction to store a copy of a contents of a memory page of the plurality of memory pages, and wherein a second flag is associated with the shadow memory page and is to be set to indicate that the memory page is more recently updated than the shadow memory page, comprising:

writing data to at least a portion of the memory page modeled in the first design abstraction in the software simulator;

detecting that the data has been written;

queuing an event to update the second flag associated with the shadow memory page in the hardware emulator;

queuing an event to write a contents of the memory page modeled in the software simulator to the shadow memory page modeled in the hardware emulator;

setting the second flag to indicate that the memory page is more recently updated than the shadow memory page;

writing the contents of the memory page to the shadow memory page prior to granting a request to access the shadow memory page; and clearing the second flag.

8. The method of claim 7, wherein the first design abstraction is a SystemC abstraction, and wherein the second design abstraction is a register transfer level abstraction.

9. The method of claim 8, wherein queuing the event to write a contents of the memory page to the shadow memory page comprises queuing the event to the command and control space of the register transfer level abstraction.

10. The method of claim 7, wherein the first design abstraction is a register transfer level abstraction, and wherein the second design abstraction is a SystemC abstraction.

11. The method of claim 10, wherein queuing the event to write a contents of the memory page to the shadow memory page comprises queuing a CPU interrupt to write a contents of the shadow memory page.

12. The method of claim 10, further comprising setting a flag of a flag array to prevent writing the contents of the memory page to the shadow memory page.

13. The method of claim 7, further comprising:
observing a performance metric of the memory subsystem for various memory page and shadow memory page sizes;
generating a profile of memory synchronization events; and
calculating an optimized memory page and shadow memory page size.

14. A computer-readable non-transitory storage medium having stored thereon a plurality of instructions, the plurality of instructions when executed by a computer, cause the computer to perform:
providing a memory subsystem of an electronic system having hardware and software components modeled in a first design abstraction and a second design abstraction during functional verification of the electronic system, wherein a portion of the memory subsystem is modeled in the first design abstraction having a plurality of memory pages, and wherein a shadow memory page is modeled in the second design abstraction to store a copy of a contents of a memory page of the plurality of memory pages;
updating the memory page modeled in a first design abstraction by writing data to at least a portion of the memory page;
setting a first flag associated with the memory page to indicate that the memory page is more recently updated than the shadow memory page, wherein the first flag is associated with each memory page of the plurality of memory pages;
setting a second flag associated with the shadow memory page to indicate that the memory page is more recently updated than the shadow memory page, wherein the second flag is associated with the shadow memory page and is to be set to indicate that the memory page is more recently updated than the shadow memory page;
receiving a request to access the shadow memory page from a portion of the circuit design;
checking whether the second flag is set after a request to access the shadow memory page is received;
writing the contents of the memory page to the shadow memory page prior to granting the request to access the shadow memory page; and
clearing the first flag and the second flag.

15. The computer-readable non-transitory storage medium of claim 14, the plurality of instructions when executed by a computer, cause the computer to further perform:
updating the shadow memory page modeled in the second design abstraction by writing data to at least a portion of shadow the memory page;
setting a third flag associated with the memory page to indicate that the shadow memory page is more recently updated than the memory page, wherein the third flag is associated with each memory page of the plurality of memory pages;
setting a fourth flag associated with the shadow memory page to indicate that the shadow memory page is more recently updated than the memory page, wherein the fourth flag is associated with the shadow memory page;
receiving a request to access the memory page from a portion of the circuit design;
checking whether the second flag is set after a request to access the shadow memory page is received;
writing the contents of the memory page to the shadow memory page prior to granting the request to access; and
clearing the third flag and the fourth flag.

16. The computer-readable non-transitory storage medium of claim 14, wherein the first design abstraction is a SystemC abstraction, and wherein the second design abstraction is a register transfer level abstraction.

17. The computer-readable non-transitory storage medium of claim 14, the plurality of instructions when executed by a computer, cause the computer to further perform setting a flag of a flag array to prevent writing the contents of the memory page to the shadow memory page.

18. The computer-readable non-transitory storage medium of claim 14, the plurality of instructions when executed by a computer, cause the computer to further perform:
observing a performance metric of the memory subsystem for various memory page and shadow memory page sizes;
generating a profile of memory synchronization events; and
calculating an optimized memory page and shadow memory page size.

19. The computer-readable non-transitory storage medium of claim 14, wherein writing the contents of the memory page is performed in a single API call per block transfer.

20. A computer-readable non-transitory storage medium having stored thereon a plurality of instructions, the plurality of instructions when executed by a computer, cause the computer to perform:
providing a memory subsystem of an electronic system having hardware and software components modeled in a first design abstraction and a second design abstraction during functional verification of the electronic system, wherein a portion of the memory subsystem is modeled in the first design abstraction having a plurality of memory pages, wherein a first flag is associated with each memory page of the plurality of memory pages, and wherein a shadow memory page is modeled in the second design abstraction to store a copy of a contents of a memory page of the plurality of memory pages;
writing data to at least a portion of the memory page modeled in the first design abstraction;
detecting that the data has been written;
queuing an event to update a second flag associated with the shadow memory page, wherein the second flag is associated with the shadow memory page and is to be set to indicate that the memory page is more recently updated than the shadow memory page;
queuing an event to write a contents of the memory page to the shadow memory page;
setting the second flag to indicate that the memory page is more recently updated than the shadow memory page; and
writing the contents of the memory page to the shadow memory page prior to granting a request to access the shadow memory page; and
clearing the second flag.

21. The computer-readable non-transitory storage medium of claim 20, wherein the first design abstraction is a SystemC abstraction, and wherein the second design abstraction is a register transfer level abstraction.

22. The computer-readable non-transitory storage medium of claim 21, wherein queuing the event to write a contents of the memory page to the shadow memory page comprises queuing the event to the command and control space of the register transfer level abstraction.

23. The computer-readable non-transitory storage medium of claim 20, wherein the first design abstraction is a register transfer level abstraction, and wherein the second design abstraction is a SystemC abstraction.

24. The computer-readable non-transitory storage medium of claim 23, wherein queuing the event to write a contents of the memory page to the shadow memory page comprises queuing a CPU interrupt to write a contents of the shadow memory page.

25. The computer-readable non-transitory storage medium of claim 20, the plurality of instructions when executed by a computer, cause the computer to further perform setting a flag of a flag array to prevent writing the contents of the memory page to the shadow memory page.

26. The computer-readable non-transitory storage medium of claim 20, the plurality of instructions when executed by a computer, cause the computer to further perform:
  observing a performance metric of the memory subsystem for various memory page and shadow memory page sizes;
  generating a profile of memory synchronization events; and
  calculating an optimized memory page and shadow memory page size.

27. A functional verification system for verifying a circuit design modeled in a plurality of abstractions while maintaining memory coherency, comprising:
  a software simulator programmed with a model of a first portion of a circuit design in a first design abstraction, including a first portion of a memory subsystem that comprises a memory page of a memory page pair and a first flag associated with the memory page; and
  a hardware emulator programmed with a model of a second portion of a circuit design in a second design abstraction, including a second portion of the memory subsystem that comprises a shadow memory page of the memory page pair and a second flag associated with the shadow memory page, wherein the hardware emulator is electrically connected to the software simulator to allow communication during functional verification;
  wherein the first flag when set indicates that the memory page is more recently updated than the shadow memory page, and is configured to be set in response to a write access to the memory page, and
  wherein the second flag when set indicates that the memory page is more recently updated than the shadow memory page, and is configured to be set to prevent a request to access the shadow memory page in response to a write access to the memory page, and cleared to allow the request to access the shadow memory page after a contents of the memory page is copied to the shadow memory page.

28. The functional verification system of claim 27,
  wherein the model of the memory subsystem further comprises:
    a third flag, associated with the second memory page, to indicate when set that the second memory page is more recently updated than the first memory page, wherein the third flag is configured to be set in response to a write access to the second memory page; and
    a fourth flag, associated with the first memory page, to indicate when set that the second memory page is more recently updated than the first memory page, wherein the fourth flag is configured to be set in response to a write access to the second memory page and cleared after a contents of the second memory page is copied to the first memory page.

29. The functional verification system of claim 27, wherein the first design abstraction is a SystemC abstraction, and wherein the second design abstraction is a register transfer level abstraction.

30. The functional verification system of claim 27, wherein the second portion of the memory subsystem further comprises a flag array, including the second flag, to prevent writing the contents of the first memory page to the second memory page.

* * * * *